(12) United States Patent
Cesare

(10) Patent No.: US 6,360,357 B1
(45) Date of Patent: Mar. 19, 2002

(54) ADDING CODE IN AN APPLICATION DURING RUNTIME TO ENRICH OBJECT BEHAVIOR

(75) Inventor: Laurent Di Cesare, La Ferte sous Jouarre (FR)

(73) Assignee: Dassault Systems (FR)

( * ) Notice: Subject to any disclaimer, the term of this patent is extended or adjusted under 35 U.S.C. 154(b) by 0 days.

(21) Appl. No.: 09/329,729

(22) Filed: Jun. 10, 1999

(51) Int. Cl.[7] .................................................. G06F 9/44
(52) U.S. Cl. .................... 717/1; 717/2; 717/5; 700/182; 716/11; 345/826; 345/765; 345/809; 345/964
(58) Field of Search .............................. 717/1; 345/334, 345/347, 157, 168, 964, 826, 809, 765; 700/182, 185, 83, 193; 716/11

(56) References Cited

U.S. PATENT DOCUMENTS

| | | | | |
|---|---|---|---|---|
| 5,689,711 A | * | 11/1997 | Bardasz et al. ................. | 717/1 |
| 5,815,154 A | * | 9/1998 | Hirschtick et al. .......... | 345/356 |
| 5,867,175 A | * | 2/1999 | Katzenberger et al. ..... | 345/473 |
| 5,971,589 A | * | 10/1999 | Hazama et al. ............. | 700/145 |
| 5,984,502 A | * | 11/1999 | Calder ......................... | 700/83 |
| 6,045,584 A | * | 4/2000 | Benzel et al. ................. | 716/11 |
| 6,173,437 B1 | * | 1/2001 | Polcyn .......................... | 717/1 |
| 6,182,277 B1 | * | 1/2001 | DeGroot et al. ............... | 717/1 |

* cited by examiner

Primary Examiner—Tuan Q. Dam
(74) Attorney, Agent, or Firm—Victor Geraci, Esq.; Clifford Chance Rogers & Wells LLP

(57) ABSTRACT

A method, apparatus and system for allowing an end-user to define at run-time the way an object in the system will react to existing operations, or events, that are later performed on the object. In the system of the invention, the end-user can attach to the object code specifying behavior that the user wishes the object to exhibit from that point forward. The code defining the new or additional behavioral features will be interpreted by the applications software so that each time an event or operation is performed on the object, the system will recognize that the object has user-specified behavior associated therewith. The code remains associated with the object. In the system of the invention, there is no need to exit the application software. The new code specifying the desired behavior is immediately callable and executable by the system upon being input.

18 Claims, 8 Drawing Sheets

ADDING CODE IN AN APPLICATION DURING RUNTIME TO ENRICH OBJECT BEHAVIOR

BACKGROUND

The present invention relates to computer software utility programs, and more specifically to programs in the field of computer aided design (CAD), computer aided manufacturing (CAM), computer aided engineering (CAE) and program data management software systems.

In such systems features or objects that are the subject of a design process can be manipulated by the operator in various ways as specified by the applications software. Typically, such manipulations are known as events. For example, in a CAD/CAM system, a user may wish to place a certain object or feature, for example, a hole, in an object being designed on the system, such object typically being graphically displayed on a video display. The system application code provides that the user can cause certain events to occur with respect to the feature or object. For example, the user may cause a "drag and drop" event to occur with respect to the hole, the effect of which is to place a copy of the hole in another location. In a known system, the user would place a cursor on the hole, click a button on a mouse, and then drag the hole onto an object into which the user wishes to place a hole by moving the cursor. The data structure of the feature contains code dictating the behavior of the hole when it is dropped onto an object. For example, the code for the feature would specify that the hole should assume a length commensurate with the width of the part onto which the hole was placed. In this manner, the selected feature will behave in a manner dictated by the previously written and compiled system application code when certain user-selected events occur on the feature.

It has been found to be extremely useful to attach knowledge or additional behavioral characteristics to a particular selected feature being created or manipulated in the course of running an application, such that the particular selected feature or object will exhibit a specific additional behavior in defined circumstances or upon occurrence of a defined event or action requested by the user. The additional behavioral characteristics are expressed as a piece of software code, for example a script or other interpreted language, which are interpreted by the system when the specified event occurs with respect to the identified object or feature, causing the object or feature to behave as defined by the script.

In known systems, to attach knowledge or behavior to an object a user must exit the application program, write program code adding behavior for the particular selected object, and compile and link the resulting program before restarting the application in which he was working. This is a cumbersome and time-consuming process, which interrupts the user's design process. In addition, many users would not be comfortable with the process if they lack the necessary programming skills for modifying the applications software. Also, the user would need to have access to the code for the application he is using.

It is also known to write code for additional behavior in macros, which the user may specify each time the user causes an event to occur. However, the use of macros is cumbersome and inadequate since the user must specify the context of an event each time the macro is run. Thus, while macros allow for the customization of the whole application, they do not allow the addition of behavior to one specific feature.

There is therefore a need for an easy-to-use system which can allow a user to add knowledge or behavioral characteristics to a feature such that the additional behavior needs to be specified for a particular feature only once. In addition, there is a need for a system which allows a user to specify additional behavior for a feature without having to leave the application, so that the additional behavior is exhibited immediately with respect to the selected feature and event.

SUMMARY OF THE INVENTION

Accordingly, the present invention provides a system, method and apparatus for allowing a user, without leaving the application in which he is working, to prepare code describing the behavior or other knowledge-based characteristic a specific object or feature should exhibit each time a specific event becomes associated with the object during the course of running the application. The user may prepare the code at the time he creates the object or at any later time upon selecting an already existing object.

Generally, in one aspect of the invention, the additional behavior will be permanently associated with the object, and if copies of the object are made, the additional knowledge and behavior will also be copied, so that the copied object is identical to the initial behaviorally modified object.

In another aspect of the invention, the user can create a behavior for an object by selecting a behavior creation icon or symbol displayed on the screen after selecting an object. Upon selection of the icon, a dialogue box is displayed in which the behavioral code or script can be written. Following completion of the writing of the code, the user may exit the dialogue box, whereupon the application stores the object, event, and behavioral code in a behavior data structure. As indicated, the new behavior is immediately associated with the object, and design work can continue without interruption.

DETAILED DESCRIPTION OF THE INVENTION

Figure 1:
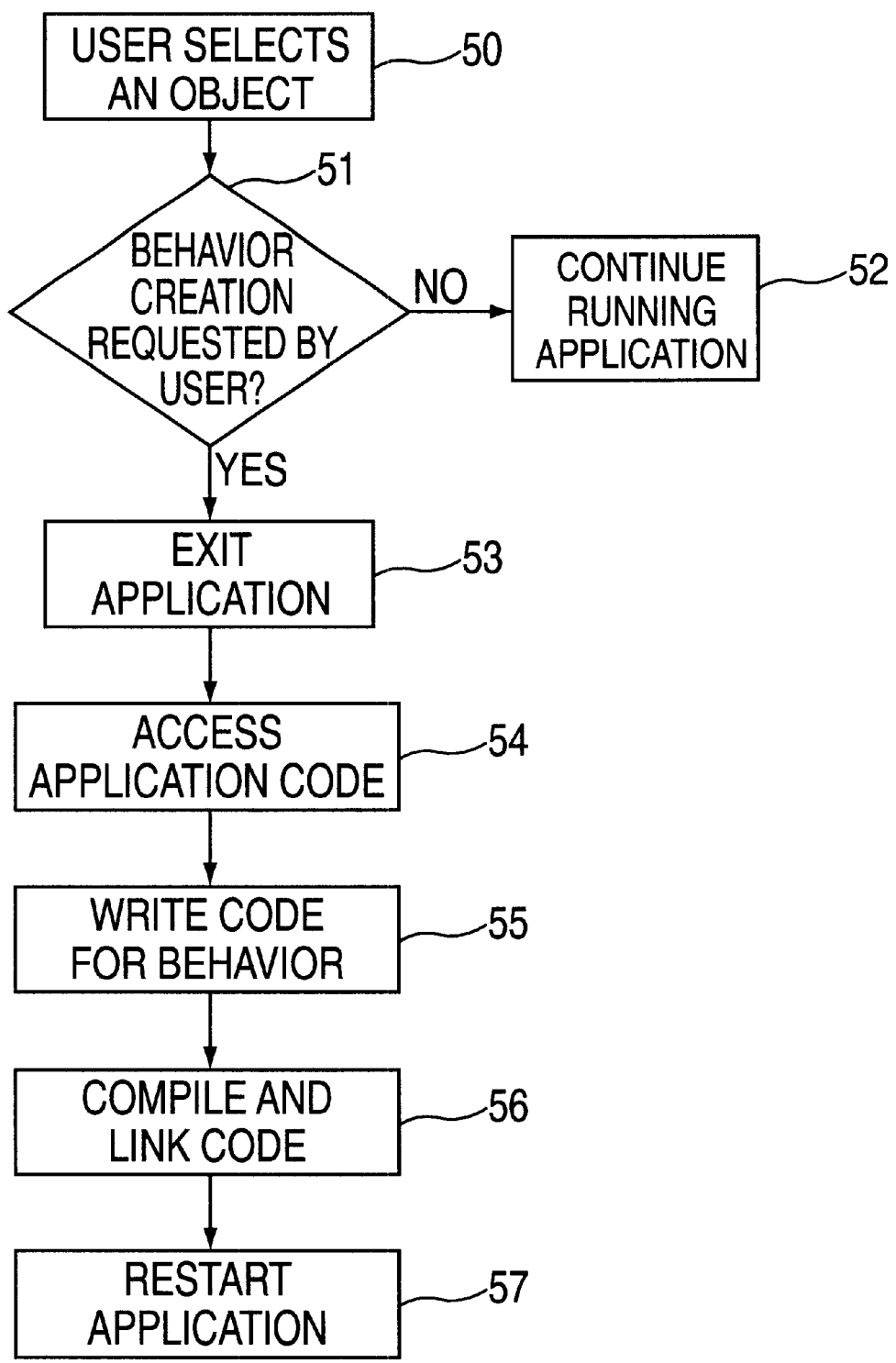
FIG. 1 is a schematic diagram of a conventional computer aided design process in which a user must exit the software application in order to add behavior to an object to be exhibited when an event occurs.

Referring to FIG. 1, a schematic representation of the method that must be employed by a user of a prior art CAD/CAM system is depicted. During running of the application, the user may select an object that he wishes to include in the design being created, as depicted in step 50. The user must then decide whether to add behavioral characteristics to the selected object, as shown in step 51. In the event that the user does not wish to add knowledge or behavior, the user may proceed with the design process by continuing to run the application, step 52. However, as shown in steps 53 through 57, in the event that the user wishes to create behavior for the object, the user must leave the application. This involves saving the design in its then present state, exiting the application, accessing the application code, determining the appropriate location within the code in which to place additional code, writing new code for the object specifying the enhanced behavior, linking the new object with the specified event and behavior, compiling the code, and restarting the application. The result is that the application source code has been modified so that a new version of object has been created with the additional behavioral characteristics. The user will from that point forward need to know which version of the object he wishes to access during the design process, i.e., the original object, or the behaviorally modified object. This process must be followed each time new behavior is to be associated with an object.

Figure 2:
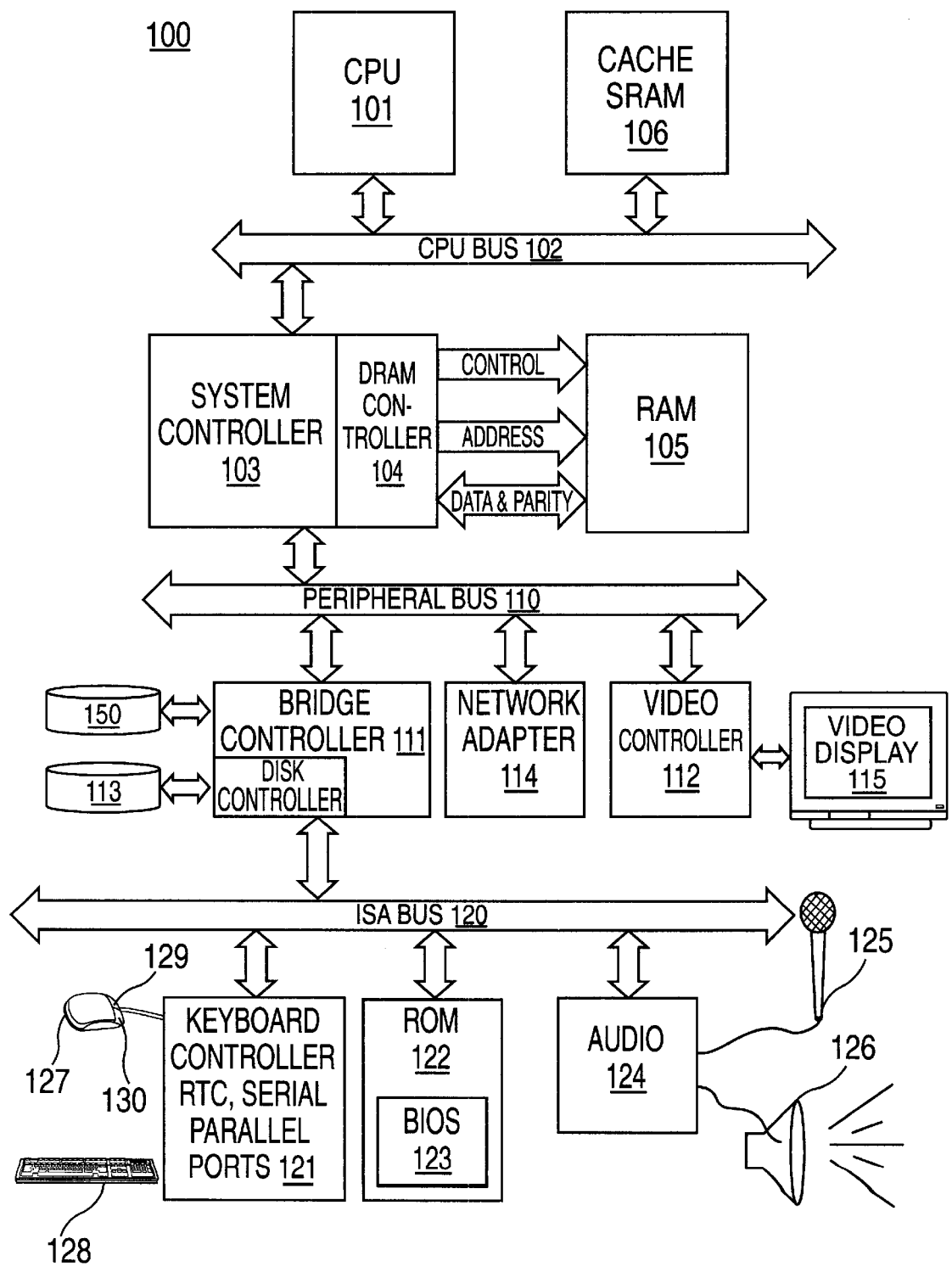
FIG. 2 is a block diagram of a computer system capable of use with the present invention.

Referring to FIG. 2 physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of designs on the video computer display 115.

Figure 3:
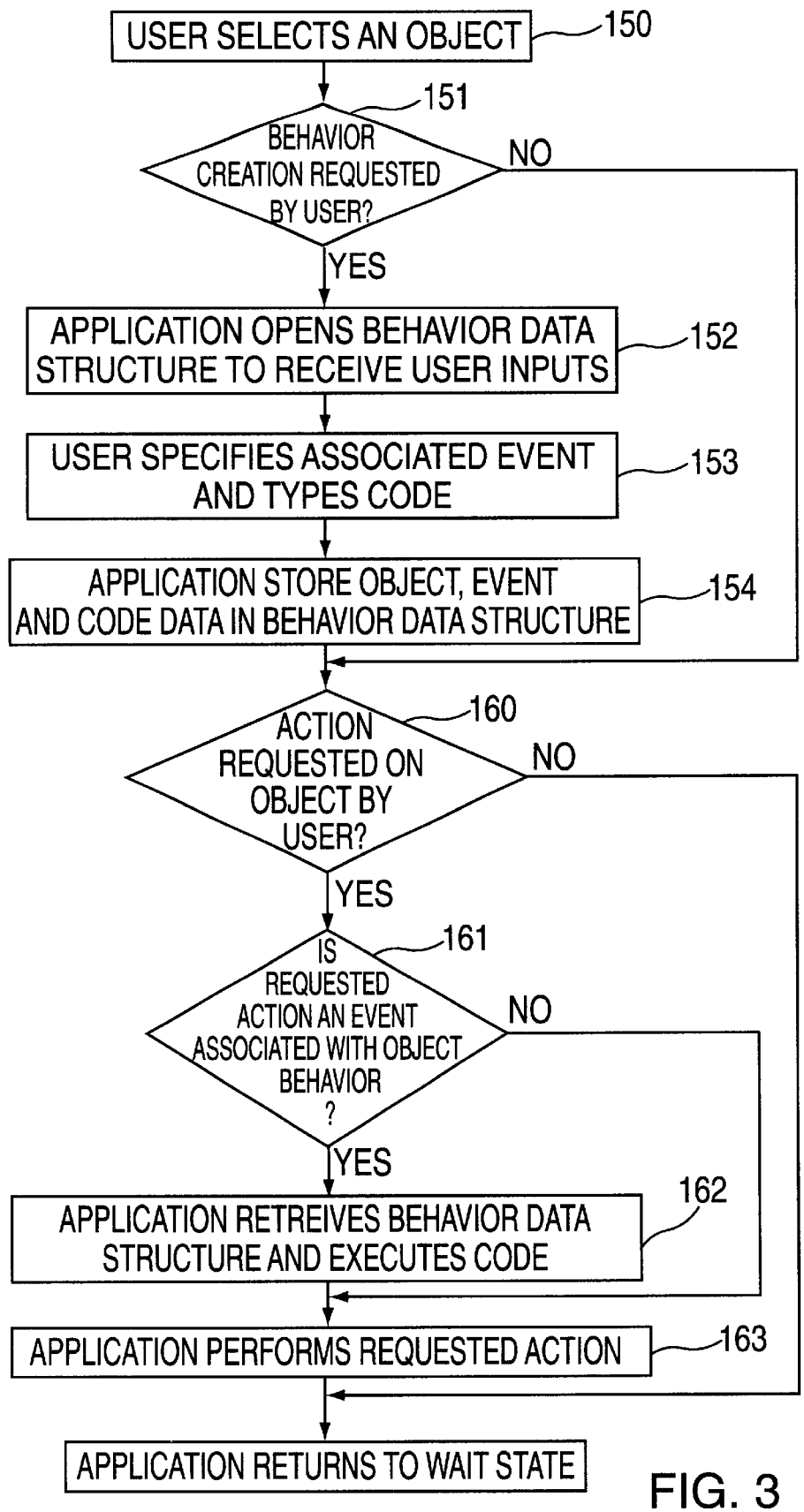
FIG. 3 is a schematic representation of the system of the invention.

Referring now to FIG. 3, a schematic representation of a method for achieving the invention is depicted. At any time during the running of the CAD/CAM application program, a user may select an object that the user wishes to manipulate in some fashion (step 150). At that time, the user must decide if he wishes the object to exhibit additional behavior not previously coded for in the application code (step 151). In the event that the user wishes the object to continue to behave as coded for in the application software, the user simply proceeds with the running of the application by, for example, selecting an action to be performed on an object (step 160). However, in the event that the user wishes to add behavior to the object (step 151), the application will open a behavior data structure to receive user inputs (step 152). The user would then write code, for example by typing the code on a keyboard input, specifying the behavior that is to be exhibited by the object when certain specified events are performed (step 153). The user may write the code in any interpreted computer language, for example a scripting language. When the user has finished writing the code, the application stores the code in a behavior data structure (step 154) in which the selected object and specified events are identified. According to the invention, the operation of specifying behavior is performed by the user without exiting the application program, and the new behavior of the object manifests itself immediately when the coded-for events are selected by the user from that point forward in the design process. Each time the user commands that an event be performed with respect to an object (160), the application program of the present invention will check whether a behavior data structure containing code for additional behavior exists with respect to the selected object (step 161). If none exists, the application will perform the requested action on the object according to the pre-existing code extant in the application software. However, in the event that a behavior data structure exists for object and requested event, the application program will call and execute the appropriate code corresponding to the selected event (steps 162, 163), so that the object exhibits the desired behavior.

Figure 4:
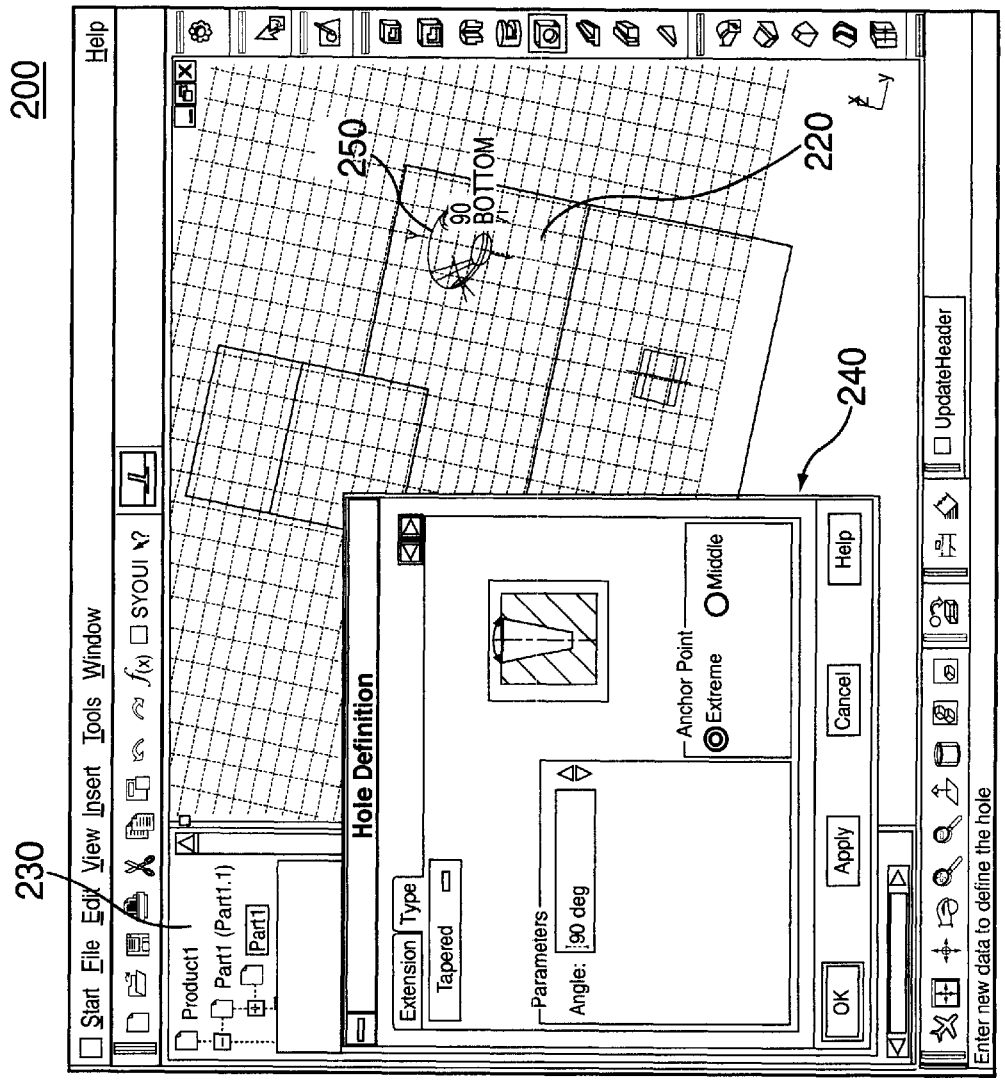
FIG. 4 illustrates a visualization of a computer generated model or part on a CAD/CAM display, and shows an exemplary dialogue box tool for entering data defining a hole.

Referring now to FIGS. 4 to 8, an example of the invention is described by illustrative example by reference to video display images exhibited in a preferred embodiment of the invention. In FIGS. 4 to 8, the object to which the user wishes to add behavior is a hole, and the event that the additional behavior is associated with is a drag and drop event. Referring now to FIG. 4, a CAD/CAM display 200 can be viewed while running a CAD/CAM program. The CAD/CAM display can include a computer generated model or part 220. Also shown on the display 200 is a dialogue box 240 by which a user can specify design parameters of a hole. For example, as seen in the dialogue box 240 of FIG. 4, a user can enter values for attributes of the hole, such as the size of the hole, and may specify data indicating the angle of the hole, the type of hole, such as, for example a tapered hole or a counter-bored hole. The user may also enter data indicating the anchor point of the hole for use in positioning the hole 250 on the part being designed 220.

Figure 5:
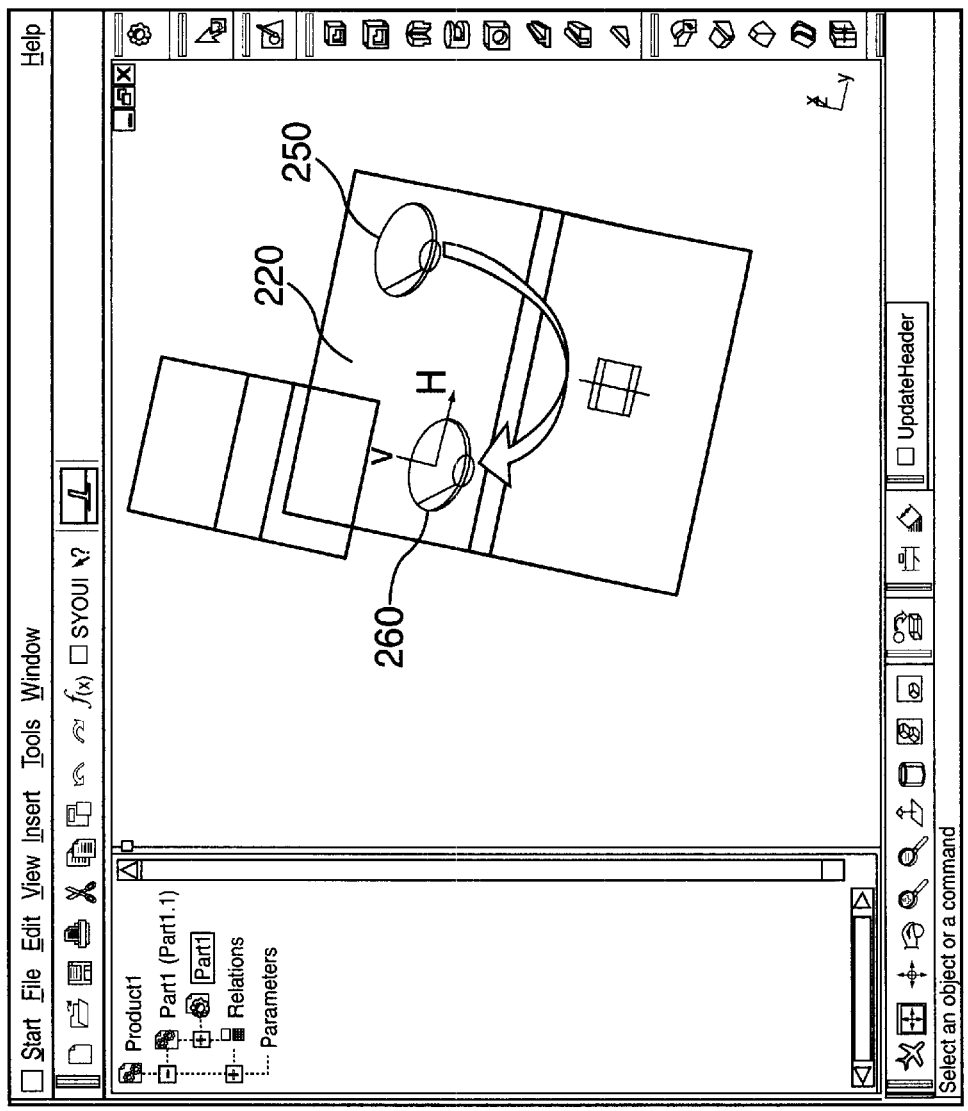
FIG. 5 depicts an exemplary event known as a "drag and drop" event, performed with respect to an exemplary object, in this case a hole.

Referring now to FIG. 5 there is shown a part with the previously created hole 250 positioned thereon. FIG. 5 depicts what occurs when a drag and drop event is applied to the hole. To initiate the drag and drop event, the user would position a movable cursor or icon over the selected feature, in this case, hole 250. The cursor or movable icon may be positioned by use of a mouse or other pointing device. The user then causes a command to be issued to the computer system 100 requesting that the selected feature be copied to another location. In this case, the command is issued by depressing a button on the mouse while the cursor is positioned over the hole. The user then moves the cursor to the location he desires to place another hole, and releases the mouse button. The computer system under the direction of the application software then places of copy 260 of the hole 250 in the new location. The new hole 260 contains all of the attributes of the copied hole 250.

As discussed, the user may desire to add behavior to hole 250. As an example, the user may wish to specify that when a drag and drop event is performed on the hole, certain attributes of the hole should change, depending on attributes of the part onto which the hole is dropped. For example, a user may wish to specify that if the hole is dropped onto a part that is made of wood, the hole type should change to a tapered hole; or the user may wish to specify that if the hole is dropped onto a part made of steel, the hole should be counterbored; as another example, the user may wish the depth and diameter of the hole to change in accordance with the length or volume of the object onto which the hole is being dropped.

Figure 6:
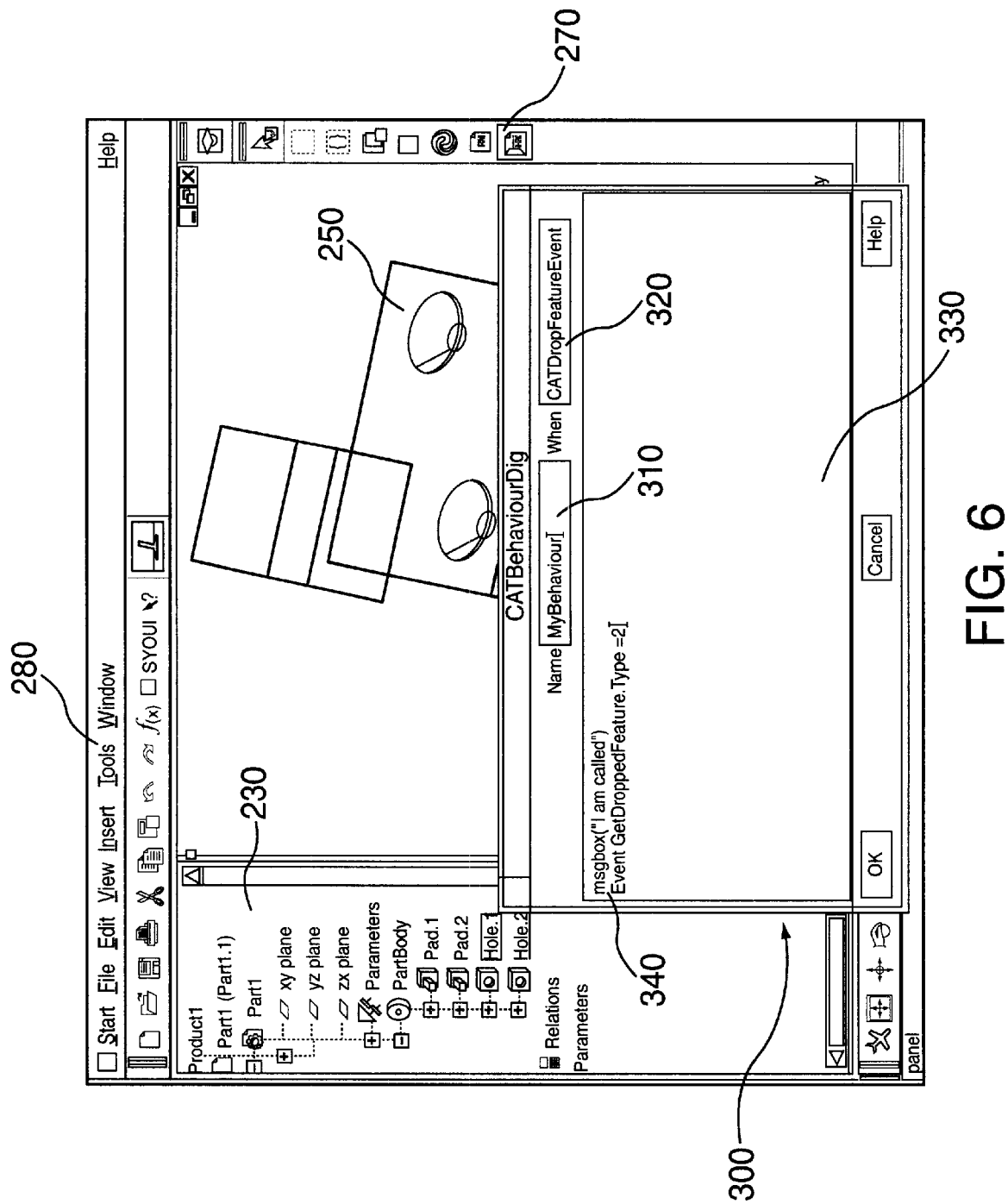
FIG. 6 illustrates a CAD/CAM display with a dialogue box tool for entering code specifying behavior of an object.

Referring now to FIG. 6, in the event that the user wishes to add behavior to an object, in this case the hole, 250, after the hole has been chosen, the user causes a command to issue to the computer system specifying that a dialogue box 300 should be displayed on the video display that will allow for the writing and entry of code. The user may issue this command, for example, by clicking on an icon such as icon 270, or by selecting a command from a menu 280 in a toolbar. As shown the dialogue box may contain fields allowing the entry of a name for the behavior 310, and a field allowing the entry of data specifying the event to which the new behavior should apply 320. The dialogue box also contains a field 330 into which the user types code specifying the new behavior. Shown in FIG. 6 at 340 is code written in Visual Basic™, a scripting language, indicating that when a drag and drop event is performed on the selected hole, a message will be displayed stating "I am called" and the type of hole should be changed to "type=2", which in this example is a counter-bored hole. Once the user has completed writing the code, he closes the dialogue box, whereupon the new behavior is stored so as to be called whenever a drag and drop event is performed on the hole 250. This new behavior will be exhibited by hole 250 and any copies that are made of hole 250, but will not apply to other holes in the design, unless the user chooses to add the behavior to other holes.

Also shown in FIG. 6 is an area 230 on the computer display showing a description of the displayed part as a specification tree, wherein each node corresponds to an object that can be handled by the user. For example, a hole will appear in the specification tree under the node representing the object or part through which the hole projects. The specification tree can also be used to select a projection plane of the computer generated part 220.

Figure 7:
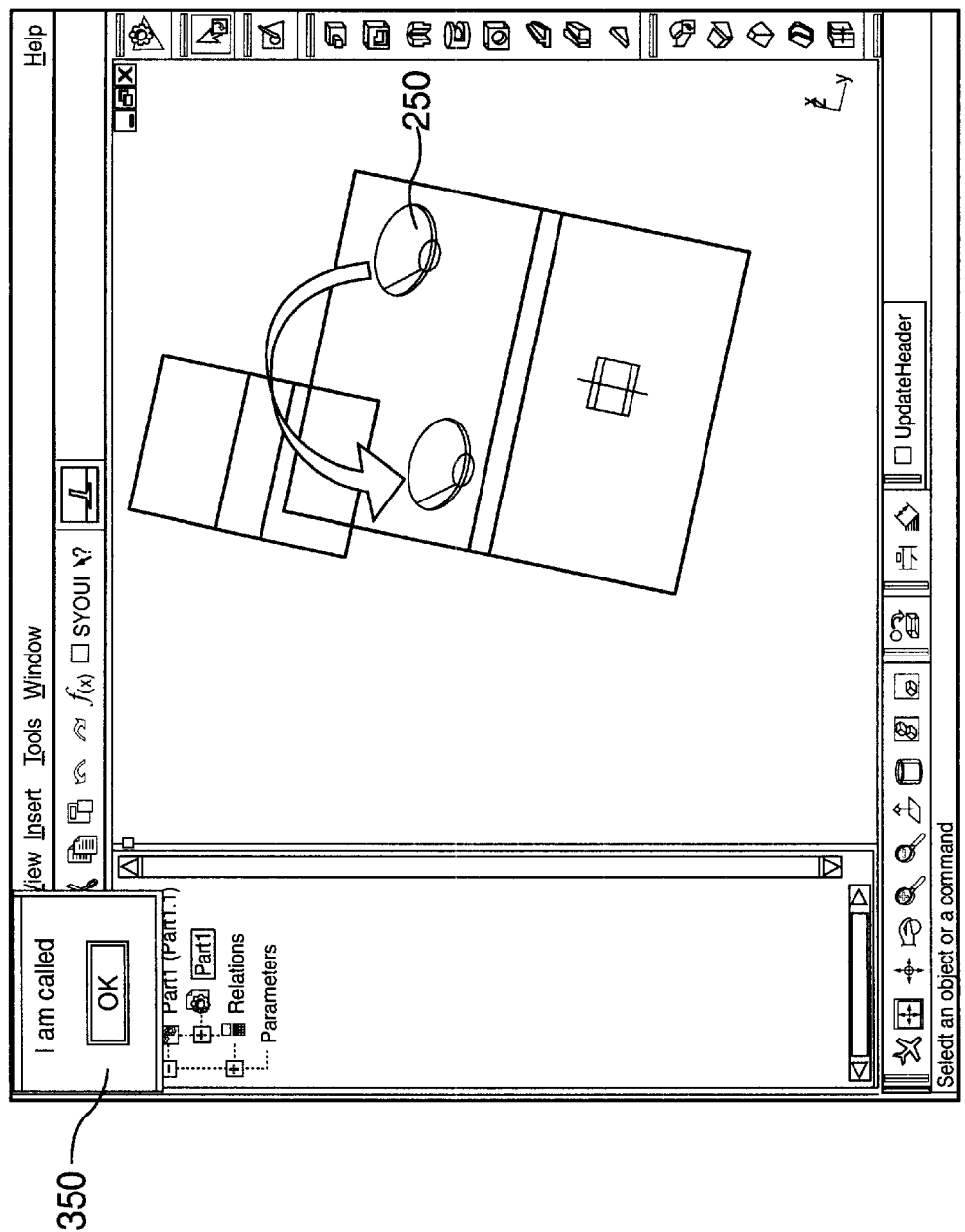
FIG. 7 illustrates a CAD/CAM display with a message box displaying a message in accordance with user-added behavioral code.
Figure 8:
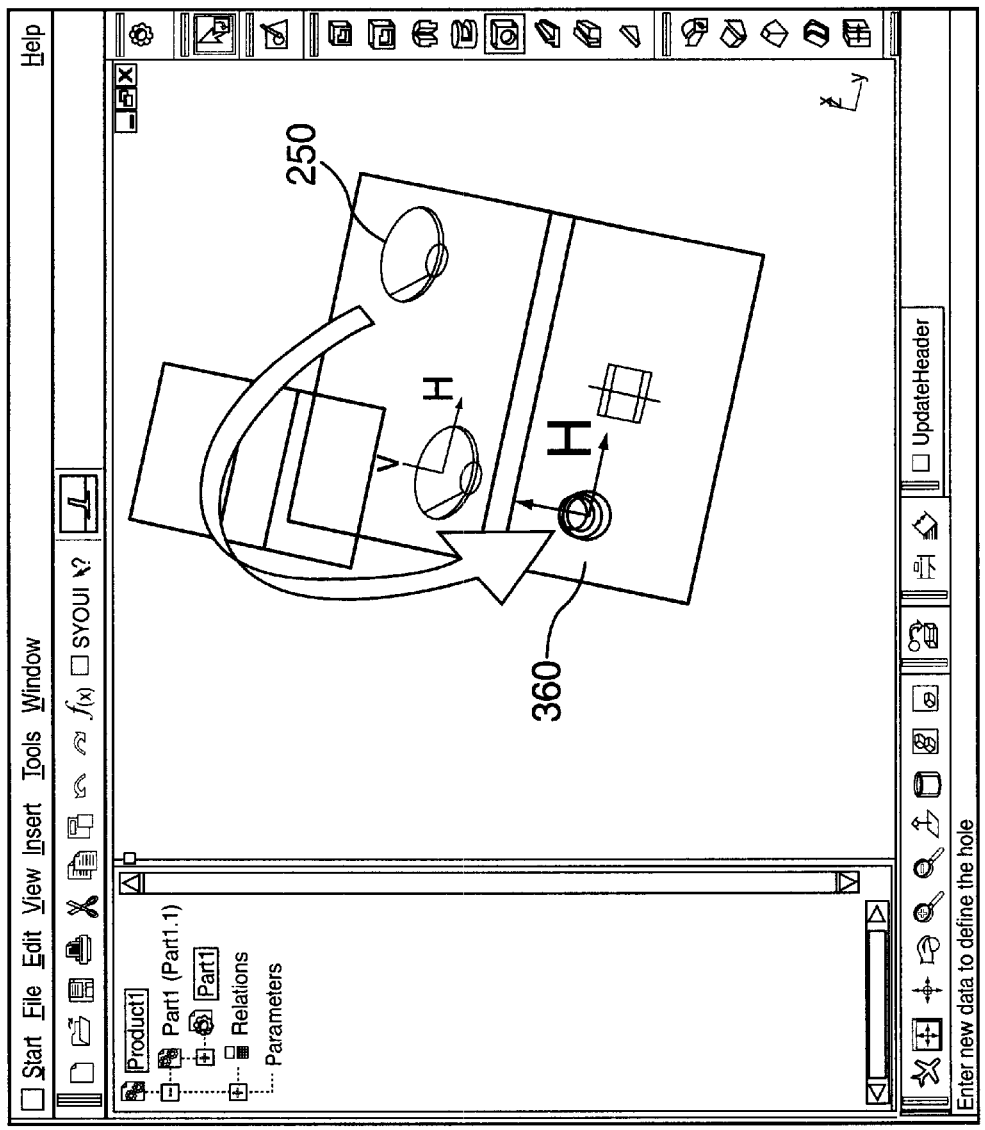
FIG. 8 illustrates a graphic display in accordance with the invention of an example of user added behavior exhibited by an object when subjected to an event for which additional behavior has been added by the user.

Referring now to FIG. 7, the display of message box 350 is displayed when a drag and drop event is performed on hole 250, in accordance with the coded new behavior. In addition, as shown in FIG. 8, when hole 250 is dropped, in accordance with the code for the new behavior, the copy of hole 250, designated 360 in FIG. 8, assumes a counter-bored configuration.

Set forth below is a sample copy of code for new behavior, in accordance with the preferred embodiment of the invention. It is written in Visual Basic™, involves a drag and drop event, and is coded for a hole:

```
msgbox("I am called")
if    Event.GetTargetOfType("CATIAPad")
.FirstLimit.Dimension.Value>20 then
    Event.GetDroppedFeature.Diameter.Value=10
    Event.GetDroppedFeature.Type=2
Event.GetDroppedFeature.HeadDiameter.Value=
Event.GetTargetOfType("CATIAPad")
.FirstLimit.Dimension.Value/2
else
    Event.GetDroppedFeature.Type=0
    Event.GetDroppedFeature.Diameter.Value=
       Event.GetTargetOfType("CATIAPad")
       .FirstLimit.Dimension.Value/3
end if
Event.GetDroppedFeature.BottomLimit.Dimension.Value=
Event.GetTargetOfType("CATIAPad")
.FirstLimit.Dimension.Value-5
```

This code specifies retrieval of the dropped object and some of its properties. The statement "GetTargetOfType" retrieves data specifying attributes of the part onto which the hole was dropped. The code specifies that if a selected dimension of the "CATIAPad" part is greater than a value of twenty, then the diameter of the hole should be set to a value of ten, and its type should be changed to "Type=2", which in this example is a counter-bored hole. The code also specifies that the head diameter of the counter-bored hole should be set to half the value of the selected dimension of the "CATIAPad" part. The code further provides that in the event that the selected value of the "CATIAPad" part is not set to a value greater than twenty, the type of hole should be set to "Type=0" and the diameter of the hole should be set to one third the value of the selected dimension of the "CATIAPad" part. Finally, the code specifies that the length of the dropped hole should be set to the value of the length of the "CATIAPad" part, minus a value of five.

In the preferred embodiment of the invention, the code adding new behavior is written in a scripting language, such as Visual Basic™ or JavaScript™. However, other types of interpreted languages may also be employed, for example, Java™.

It is to be understood that any object or feature capable of being defined by the CAD/CAM system can be the subject of the invention, and behavior can be specified with respect to any event in the CAD/CAM system. Further examples of objects which can be modified are screws, bolts, gears, boxes, rods, beams, etc. Further examples of events are object creation, deletion, copying, instanciation (i.e., copying an object with links), highlighting an object, and modifying a parameter of an object (such as length, name, or mass).

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. As stated, the programming language used by the user to write the behavioral code must be an interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A computer system operation method for allowing end-users to define at run-time the way an object displayed by the system on a graphical user interface will react to events performed on the object, wherein said computer system utilizes an application software program, the method comprising:
   selecting an object;
   specifying behavior the object is to exhibit when a particular event is performed on the object; and
   storing the behavior in a data structure associated with the object; wherein said step of specifying behavior is performed while the application software is running.

2. The method of claim 1 wherein the step of specifying behavior comprises writing executable computer instructions.

3. The method of claim 2 wherein the step of specifying behavior comprises writing executable computer instructions in the form of a scripting language.

4. The method of claim 1 additionally comprising activation of a dialogue box on the graphical user interface and entering the behavior in the dialogue box through activation of a keyboard.

5. A method of dynamically adapting a computer aided design system comprising:
   running application software coding for computer aided design functionality;
   receiving input from a user comprising behavioral rules for an object, said behavioral rules specifying behavior to be implemented upon the occurrence of user-specified events; and
   processing said input so that said behavioral rules are integrated in said application software while said application software is running.

6. The method of claim 5, wherein the application software is in the form of machine executable compiled code.

7. The method of claim 5, wherein the system receives input through use of a keyboard.

8. The method of claim 5, wherein the system includes a visual display, and wherein the behavioral rules are input in the system through the use of a graphically displayed dialogue box.

9. A computer program product comprising:
   a computer usable medium having computer readable code embodied on said medium for causing a computer to take steps comprising:
   providing a user with an interface for allowing the input of code specifying additional behavior of an object while the code is running on the computer;
   receiving said code through an input device; and
   executing such code so that the object exhibits the additional behavior specified by the code.

10. The code of claim 9, wherein the interface comprises a graphical object displayed on a visual display.

11. The code of claim 9, wherein the input device comprises a keyboard.

12. An article of manufacture comprising:
   a computer usable medium having computer readable program code means embodied therein for causing a computer system to accept information specifying behavior of an object stored in the computer system, the computer readable program code means in said article of manufacture comprising:
   computer readable program code means for causing the computer to open an object behavior data structure upon receipt of a signal from a user of the computer indicating that behavior will be added to said object;
   computer readable code means for causing the computer to accept information specifying behavior for said object from the user through an input device;
   computer readable code means for causing the computer to store such information specifying object behavior in said behavior data structure, and for associating said behavior data structure with said object;
   computer readable code means for causing the computer to check for the presence of a behavior data structure associated with said object when said user causes an event to occur with respect to said object, and for causing said object to behave in accordance with the information in said behavior data structure.

13. A CAD/CAM apparatus comprising:
   an input device;
   a central processing unit; and
   a display device; wherein
   the central processing unit runs an application program comprising code specifying behavior of objects when subjected to coded-for events, said code further comprising code which allows a user, without exiting the application program, to input code specifying additional behavior for objects, said code for additional behavior being callable and executable by said central processing unit immediately upon being input by the user.

14. The CAD/CAM apparatus of claim 13, wherein the input device comprises a keyboard.

15. The CAD/CAM apparatus of claim 13, wherein the input device comprises a pointing device.

16. The CAD/CAM apparatus of claim 13, wherein the central processing unit is connected with at least one of a RAM or ROM.

17. A computer data signal embodied in a digital data stream comprising data including a representation of an object and data specifying behavior of said object, wherein the computer data signal is generated by the method comprising the steps of:

- retrieving during runtime a first data set representing a first object, wherein said first data set comprises data defining the shape of the object;
- receiving during runtime a second data set comprising instructions to be performed with respect to said first object upon the occurrence of specified events;
- linking during runtime the first and second data sets to form a new data set for said object; and
- generating said data signal during runtime from said new data set for said object.

18. A computer data signal embodied in a digital data stream comprising data including a representation of an image, wherein the computer data signal is generated by a computer in accordance with instructions in a computer program comprising the steps of:

- a) retrieving a first data set representing a first object, wherein said first data set comprises data defining the shape of the object;
- b) receiving a second data set comprising instructions to be performed with respect to said first object upon the occurrence of an event;
- c) changing the first data set in accordance with the instructions in the second data set; and
- d) generating said computer data signal comprising data including a representation of an image, wherein said steps a), b), and c) are performed while said computer program is running.

* * * * *